(12) United States Patent
Terasawa

(10) Patent No.: US 9,764,814 B2
(45) Date of Patent: Sep. 19, 2017

(54) DEVICE FOR DECELERATING AND REVERSING SHIP

(71) Applicant: YANMAR CO., LTD., Osaka (JP)

(72) Inventor: Yoshiaki Terasawa, Hyogo (JP)

(73) Assignee: YANMAR CO., LTD, Osaka (JP)

( * ) Notice: Subject to any disclaimer, the term of this patent is extended or adjusted under 35 U.S.C. 154(b) by 418 days.

(21) Appl. No.: 14/365,812

(22) PCT Filed: Dec. 12, 2012

(86) PCT No.: PCT/JP2012/082200
§ 371 (c)(1),
(2) Date: Jun. 16, 2014

(87) PCT Pub. No.: WO2013/089136
PCT Pub. Date: Jun. 20, 2013

(65) Prior Publication Data
US 2015/0114154 A1     Apr. 30, 2015

(30) Foreign Application Priority Data
Dec. 14, 2011   (JP) .................................. 2011-273484

(51) Int. Cl.
| F16H 57/021 | (2012.01) |
| B63H 23/08 | (2006.01) |
| B63H 23/30 | (2006.01) |
| F16H 3/14 | (2006.01) |
| F16H 57/031 | (2012.01) |

(52) U.S. Cl.
CPC ............ *B63H 23/08* (2013.01); *B63H 23/30* (2013.01); *F16H 57/021* (2013.01); *F16H 3/14* (2013.01); *F16H 57/031* (2013.01); *Y10T 74/19605* (2015.01)

(58) Field of Classification Search
CPC .............................. F16H 57/021; B63H 23/08
See application file for complete search history.

(56) References Cited

U.S. PATENT DOCUMENTS

| 3,613,469 | A | * | 10/1971 | McRoberts et al. | ... B63H 21/22 |
| | | | | | 74/361 |
| 2008/0076585 | A1 | * | 3/2008 | Inui | ........................ B60K 17/08 |
| | | | | | 464/179 |

FOREIGN PATENT DOCUMENTS

| JP | 61170749 U | 10/1986 |
| JP | 200296796 A | 4/2002 |
| JP | 2006112471 A | 4/2006 |

OTHER PUBLICATIONS

International Search Report for International Application No. PCT/JP2012/082200, date mailed; Mar. 19, 2013, with English translation.

* cited by examiner

*Primary Examiner* — William Kelleher
*Assistant Examiner* — Gregory T Prather
(74) *Attorney, Agent, or Firm* — Cantor Colburn LLP

(57) ABSTRACT

The front sides of pinions are rotatably supported by a first case via first taper roller bearings, and the back sides of the pinions are rotatably supported by a second case via second taper roller bearings, and the back sides of input shafts are rotatably supported by a case cover via third taper roller bearings, and clutches and input gears are stored in the case cover, and sleeves are interposed between the first taper roller bearings and the front side of the pinions, and the pinions are configured to be inserted and extracted into/from the sleeves.

4 Claims, 6 Drawing Sheets

DEVICE FOR DECELERATING AND REVERSING SHIP

CROSS REFERENCE TO RELATED APPLICATIONS

This is the U.S. national stage of application No. PCT/JP2012/082200, filed on 12 Dec. 2012. Priority under 35 U.S.C. §119(a) and 35 U.S.C. §365(b) is claimed from Japanese Application No. 2011-273484, filed 14 Dec. 2011, the disclosure of which is also incorporated herein by reference.

TECHNICAL FIELD

The present invention relates to a device for decelerating and reversing ships, wherein a first case, a second case, and a case cover detachable with the second case are aligned in order from one side to the other side of the device in such a manner as to form a housing, and forward and backward propulsion transmission units are stored in the housing, and any of the propulsion transmission units comprises a pinion configured to mesh with an output gear coupled with a propeller, an input shaft configured to be freely fitted with the pinion in a middle thereof, an input gear configured to be fixedly disposed on the other side of the input shaft, and a clutch configured to be interposed between the input gear and the pinion in such a manner as to connect and disconnect motive power, and in particular relates to a constitution in which the propulsion transmission units are extracted.

BACKGROUND ART

Conventionally, when a rope or wire is hooked on a ship, and the ship is pulled and towed, with respect to forward and backward input shafts in a device for decelerating and reversing ships, heavy load is acted in the radial direction of the shafts via an output gear coupled with a propeller and the like, due to the rope or the wire wound around the propeller. Accordingly, when a sliding bearing is used for the bearing of the input shaft, it is likely that excessive frictional heat is generated on a contact surface between the input shaft and the bearing, and seizure occurs.

Accordingly, there has been known a technology in which rolling bearings such as a ball bearing and a roller bearing are used to prevent the seizure, and the frictional heat generated is low (for example, see Patent Literature 1).

PTL 1: Japanese Unexamined Patent Application Publication No. 2006-112471

SUMMARY OF INVENTION

Technical Problem

However, although the seizure can be prevented by using the above-mentioned rolling bearings, the rolling bearings are vulnerable to excessive load and solid foreign matter such as dust because the rolling bearings are a precision component. Accordingly, periodical maintenance is required, but there is a problem in that it is necessary to disassemble the whole housing to perform the maintenance of the rolling bearings because bearings are arranged at the innermost positions in the housing, which is inferior in terms of maintainability.

Solution to Problem

The first aspect of the present invention is such that, with respect to a device for decelerating and reversing ships, wherein a first case, a second case, and a case cover detachable with the second case are aligned in order from one side to other side of the device in such a manner as to form a housing, and forward and backward propulsion transmission units are stored in the housing, and any of the propulsion transmission units comprises a pinion configured to mesh with an output gear coupled with a propeller, an input shaft configured to be freely fitted with the pinion in a middle thereof, an input gear configured to be fixedly disposed on other side of the input shaft, and a clutch configured to be interposed between the input gear and the pinion in such a manner as to connect and disconnect motive power, the device for decelerating and reversing ships is such that, in the pinion, there are formed an insertion cylindrical portion and a main-body cylindrical portion respectively on the one side and the other side with a tooth portion sandwiched therebetween, and the insertion cylindrical portion is rotatably supported by the first case via a first rolling bearing, and the main-body cylindrical portion is rotatably supported by the second case via a second rolling bearing, thereby rotatably supporting the pinion from back and forth in an axial direction, and a middle of the input shaft is supported by the first rolling bearing and the second rolling bearing, and wherein a sleeve is adhered and fixed on an inner circumferential surface of the first rolling bearing, and the insertion cylindrical portion is disposed in such a manner as to be inserted and extracted into/from the sleeve, and furthermore the other side of the input shaft is rotatably supported by the case cover via a third rolling bearing, and the clutch and the input gear are stored in the case cover.

The second aspect of the present invention is such that a spline is provided in the insertion cylindrical portion, and the insertion cylindrical portion is fitted and inserted into the sleeve.

Advantageous Effects of Invention

With the above-mentioned constitution, the present invention has advantageous effects described below. That is, according to the first aspect of the present invention, the second rolling bearing and the third rolling bearing can be taken out from the housing together with the propulsion transmission unit only by pulling out the input shafts after the detachment of the case cover, and it is not necessary to disassemble the entire housing for maintenance of the rolling bearings, which improves maintainability. Furthermore, only the detachment of the case cover allows the clutches, the input gears, and the third rolling bearing to be exposed to the outside, so that maintenance for these members can be more easily performed. In particular, regarding the pinion, both ends can be supported in the housing by means of the first rolling bearing and the second rolling bearing, which stabilizes the rotation of the pinion, and the input shaft can be rotatably supported by a multitude of rolling bearings that combine the first rolling bearing and the second rolling bearing with the third rolling bearing and the like, and load acted on the rolling bearings can be decentralized into a plurality of members made up of the first case, the second case, and the case cover. The rolling bearings are firmly supported, and the deviation of the rotational shaft center during rotation is reduced, so that noise and damage on the rolling bearings can be substantially restrained. Additionally, the pinion is disposed through the sleeve, so that the pinion can be inserted and extracted into/from the first rolling bearing, as is the same case where a sliding bearing is used, the pinion can be extracted together with the input shaft, thereby further improving the maintainability.

According to the second aspect of the present invention, frictional resistance can be reduced in a case where the insertion cylindrical portion is slid on the inner circumferential surfaces of the sleeves in the axial direction, and a force required for inserting and extracting the pinions into/ from the sleeves can be reduced, and work load for maintenance can be alleviated.

DESCRIPTION OF EMBODIMENTS

Figure 1:
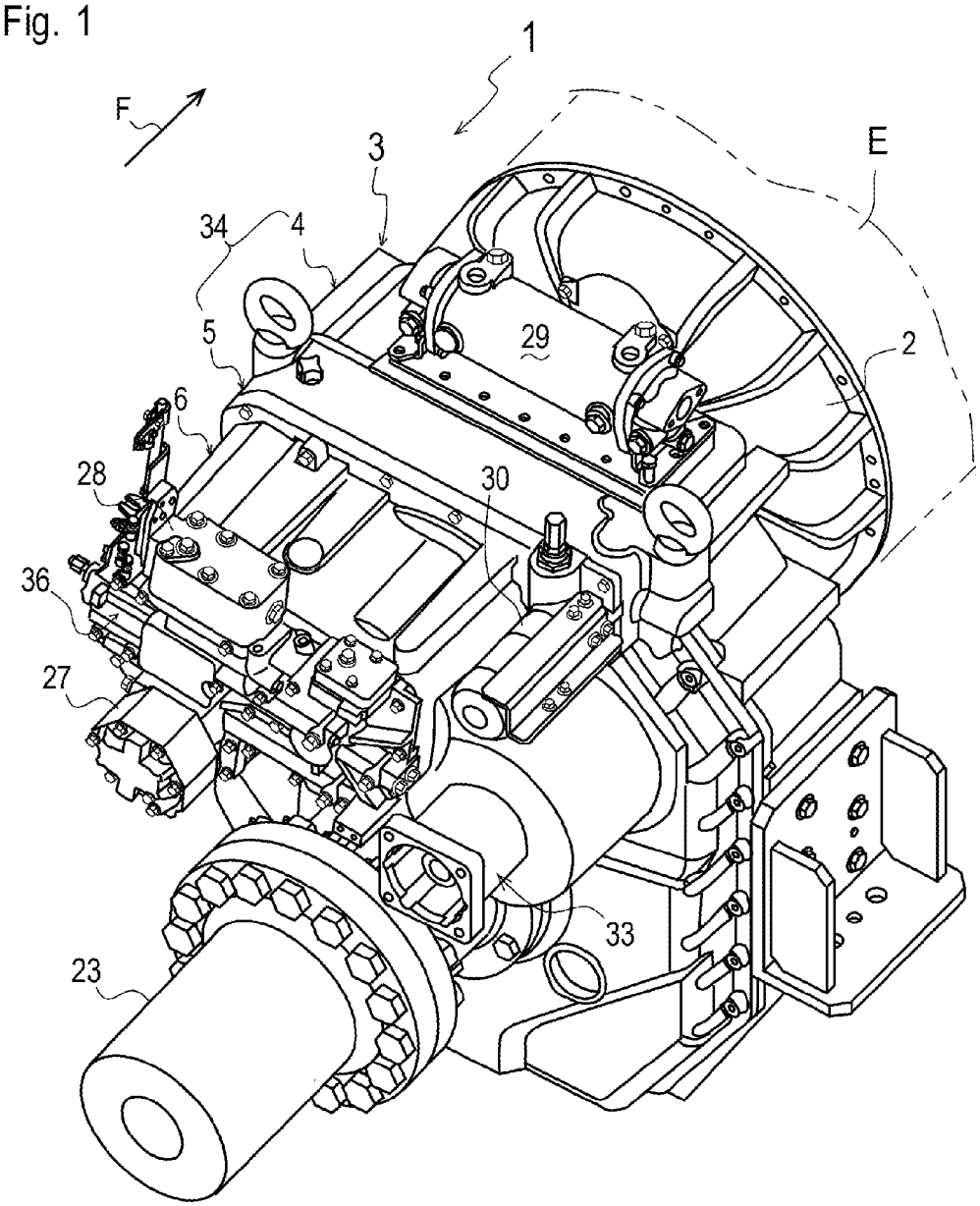
FIG. 1 is a perspective view illustrating the whole constitution of a device for decelerating and reversing ships, viewed obliquely backward to the right, according to the present invention.

Hereinafter, the embodiment of the present invention will be described. It is noted that the direction illustrated by an arrow F in FIG. 1 is regarded as the forward direction of a ship not illustrated, in which a device 1 for decelerating and reversing ships is mounted, and the forward direction serves as a standard for the position and direction of each member described below.

First, the entire constitution of the device 1 for decelerating and reversing ships according to the present invention will be described referring to FIGS. 1 to 5. The device 1 for decelerating and reversing ships includes a housing 3 attached on a rear end portion of a mounting flange 2, and the housing 3 stores a forward transmission unit 7 that outputs motive power from an engine E, as deceleration power decelerated in the forward direction (hereinafter referred to as "forward power"), a backward transmission unit 8 that outputs the motive power from the engine E as the deceleration power (hereinafter, referred to as "backward power") that rotates in the opposite direction with respect to the forward power, an output transmission unit 9 that outputs the motive power from one of the forward transmission unit 7 and the backward transmission unit 8 to the propeller of the ship, and a PTO transmission unit 10 which outputs the motive power to auxiliary instruments such as a generator not illustrated.

Then, the engine E and a damper 11 coupled with the engine E are stored in the mounting flange 2, and the damper 11 is coupled with the front end of a forward input shaft 12 of the forward transmission unit 7.

Accordingly, the motive power from the engine E is always inputted to the forward input shaft 12, and when the ship moves forward, the forward transmission unit 7 is coupled with the output transmission unit 9 as it is by means of clutches 14 and 18 described in detail later, and the forward power is transmitted to the propeller, whereas when the ship moves backward, the forward transmission unit 7 is coupled with the output transmission unit 9 via the backward transmission unit 8 by means of the clutches 14 and 18, and the backward power is transmitted to the propeller. Furthermore, the forward transmission unit 7 is always coupled with the PTO transmission unit 10, and the forward power is transmitted to the external auxiliary instruments via the PTO transmission unit 10.

Also, an oil cooler 29 is placed and fixed on the upper surface of the housing 3, and an oil filter 30 is disposed on the right upper portion on a back surface of the housing 3, and a forward-backward switching valve 28 and a hydraulic pump 27 are disposed at the upper and lower positions of the left portion on the back surface of the housing 3 via a cover plate 36 described later.

Accordingly, when the hydraulic pump 27 is driven, hydraulic oil, which is sucked from an oil reservoir in the housing 3 and filtered through a suction filter not illustrated, is supplied to the transmission units 7 and 8 via the forward-backward switching valve 28, an oil path 31, and the like. Furthermore, after being cooled by the oil cooler 29 and filtered through the oil filter 30, part of the hydraulic oil is supplied to the transmission units 7 to 10 as lubricating oil.

Next, the constitution of the motive power transmission of the device 1 for decelerating and reversing ships will be described referring to FIGS. 2 to 5. As illustrated in FIG. 3, the forward transmission unit 7 is constituted by the forward input shaft 12, a forward input gear 13 that is externally fitted and fixedly installed on the rear end of the forward input shaft 12, a forward pinion 15 that is freely fitted in the middle between the front and the back of the forward input shaft 12, and a forward clutch 14 disposed between the forward pinion 15 and the forward input gear 13.

The forward clutch 14 is a multiplate wet clutch, which includes an inner drum 15e formed on the rear end portion of the forward pinion 15 and an outer drum 13a integrally formed with the forward input gear 13, and a plurality of clutch discs 15e1 that are fixedly disposed on the inner drum 15e are alternately arranged in gaps between a plurality of pressure plates 13a1 that are fixedly disposed on the outer drum 13a.

Furthermore, a hydraulic piston 26 is arranged on the inner side of the forward input gear 13, and the hydraulic oil is supplied to the hydraulic piston 26, and the hydraulic piston 26 is pressed forward by the hydraulic pressure of the hydraulic oil, whereby the pressure plates 13a1 and the clutch discs 15e1 are pressure contacted with each other against the elastic force of a return spring 32 wound around the external circumference of the forward input shaft 12 in the inner drum 15e. Then, the outer drum 13a and the inner drum 15e are coupled via the pressure plates 13a1 and the clutch discs 15e1, and the forward clutch 14 is "engaged", which allows the forward pinion 15 to be coupled with the forward input shaft 12.

Conversely, when the hydraulic oil is not supplied to the hydraulic piston 26, the hydraulic piston 26 is pressed backward by the elastic force of the return spring 32, whereby the pressure plates 13a1 and the clutch discs 15e1 are detached from each other. Then, the coupling between the outer drum 13a and the inner drum 15e is severed, and the forward clutch 14 is "disengaged", and the forward pinion 15 and the forward input shaft 12 are disconnected.

Figure 4:
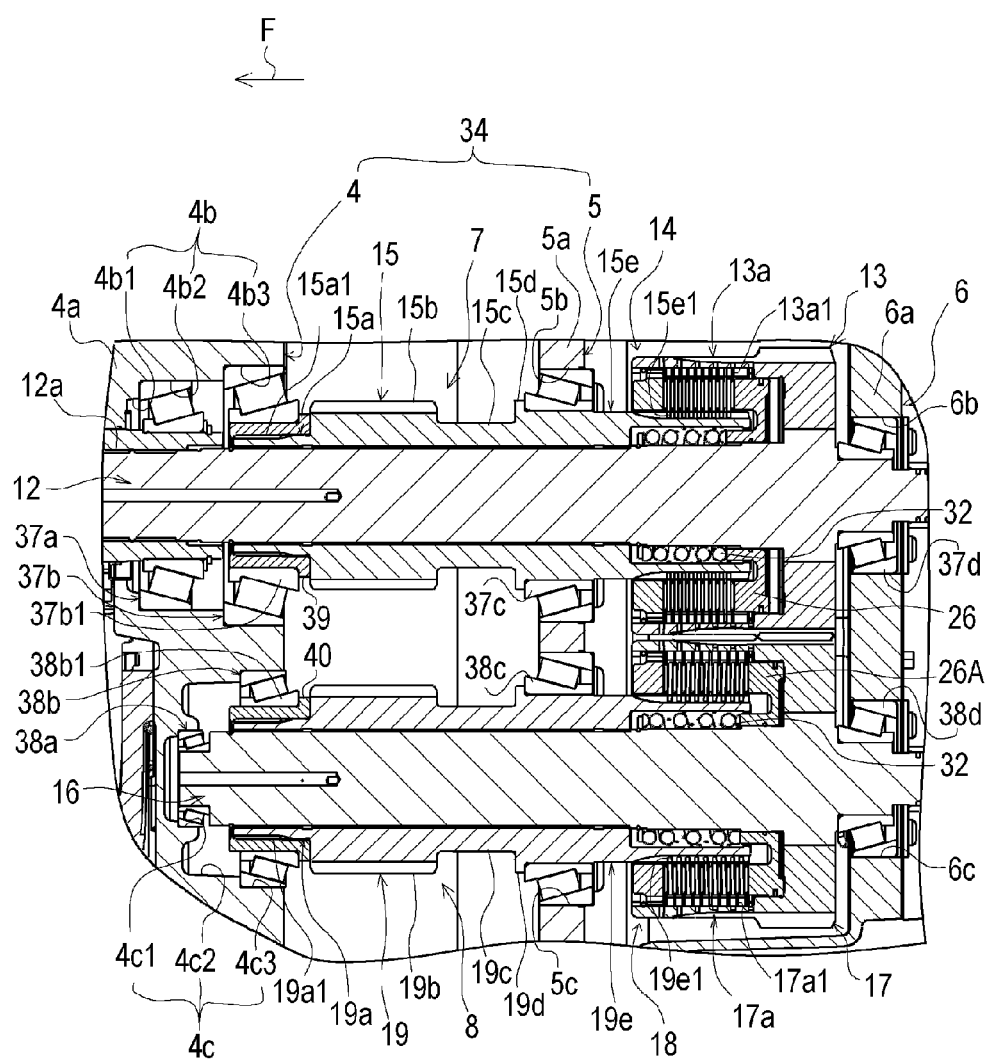
FIG. 4 is a cross-sectional view taken along the line B-B of FIG. 2.

As illustrated in FIG. 4, the backward transmission unit 8, as is the same case with the forward transmission unit 7, is constituted by a backward input shaft 16 parallel to the forward input shaft 12, a backward input gear 17 that is externally fitted and fixedly installed on the rear end of the backward input shaft 16, a backward pinion 19 that is freely fitted in the middle between the front and the back of the backward input shaft 16, and a backward clutch 18 disposed between the backward pinion 19 and the backward input gear 17.

The backward clutch 18 is also a multiplate wet clutch, and as is the same case with the forward clutch 14, the clutch disc 19e1 of an inner drum 19e and the pressure plate 17a1 of an outer drum 17a are alternately arranged, and a hydraulic piston 26A is arranged on the inner side of the backward input gear 17.

Accordingly, when the hydraulic piston 26A is pressed forward by the hydraulic oil, the backward clutch 18 is "engaged", and the backward pinion 19 is coupled with the backward input gear 17 via the backward clutch 18. Conversely, when the hydraulic oil is not supplied to the hydraulic piston 26A, the hydraulic piston 26A is pressed backward by the return spring 32, and the backward clutch 18 is "disengaged", and the backward pinion 19 and the backward input gear 17 are disconnected.

Figure 2:
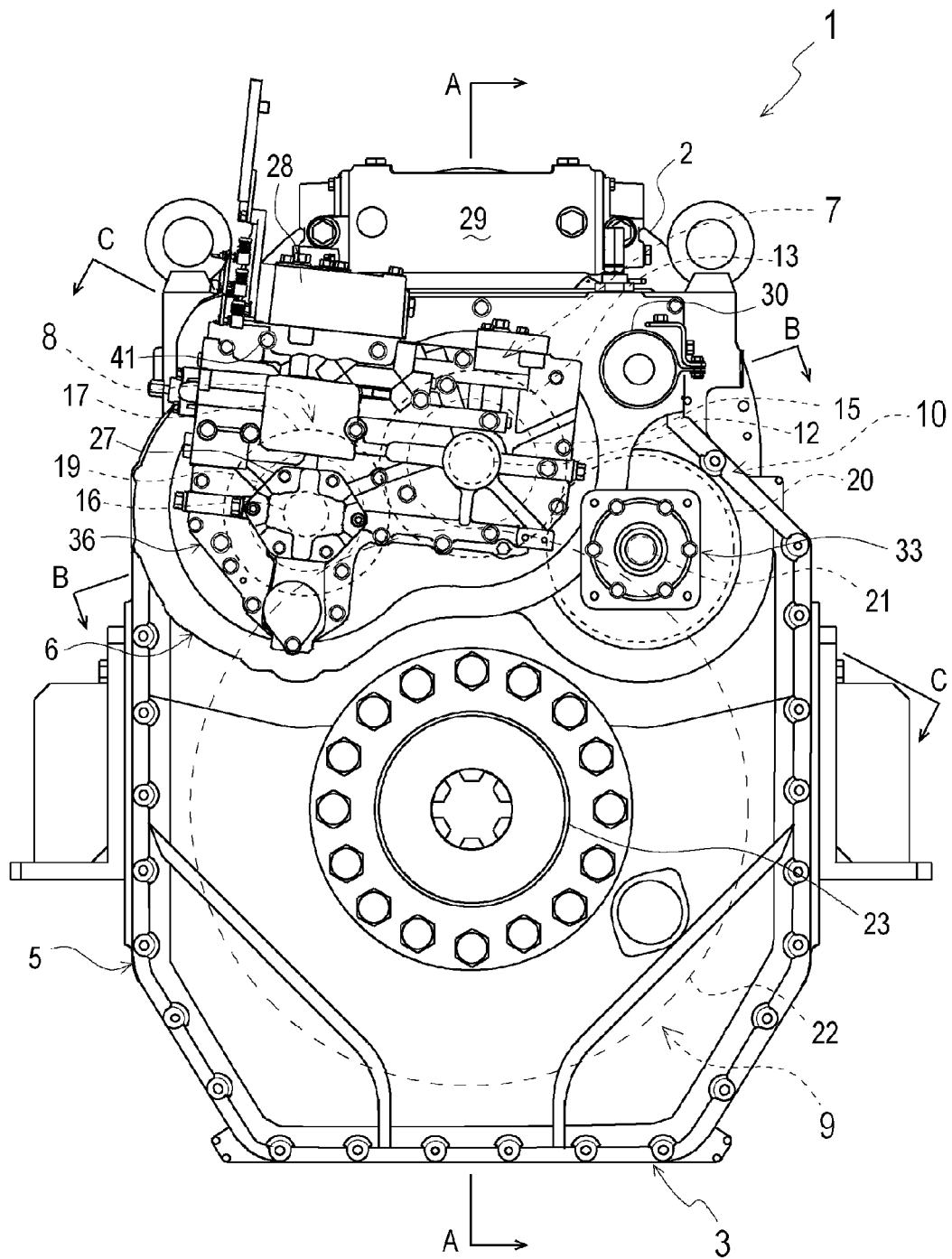
FIG. 2 is a back view of the same.
Figure 3:
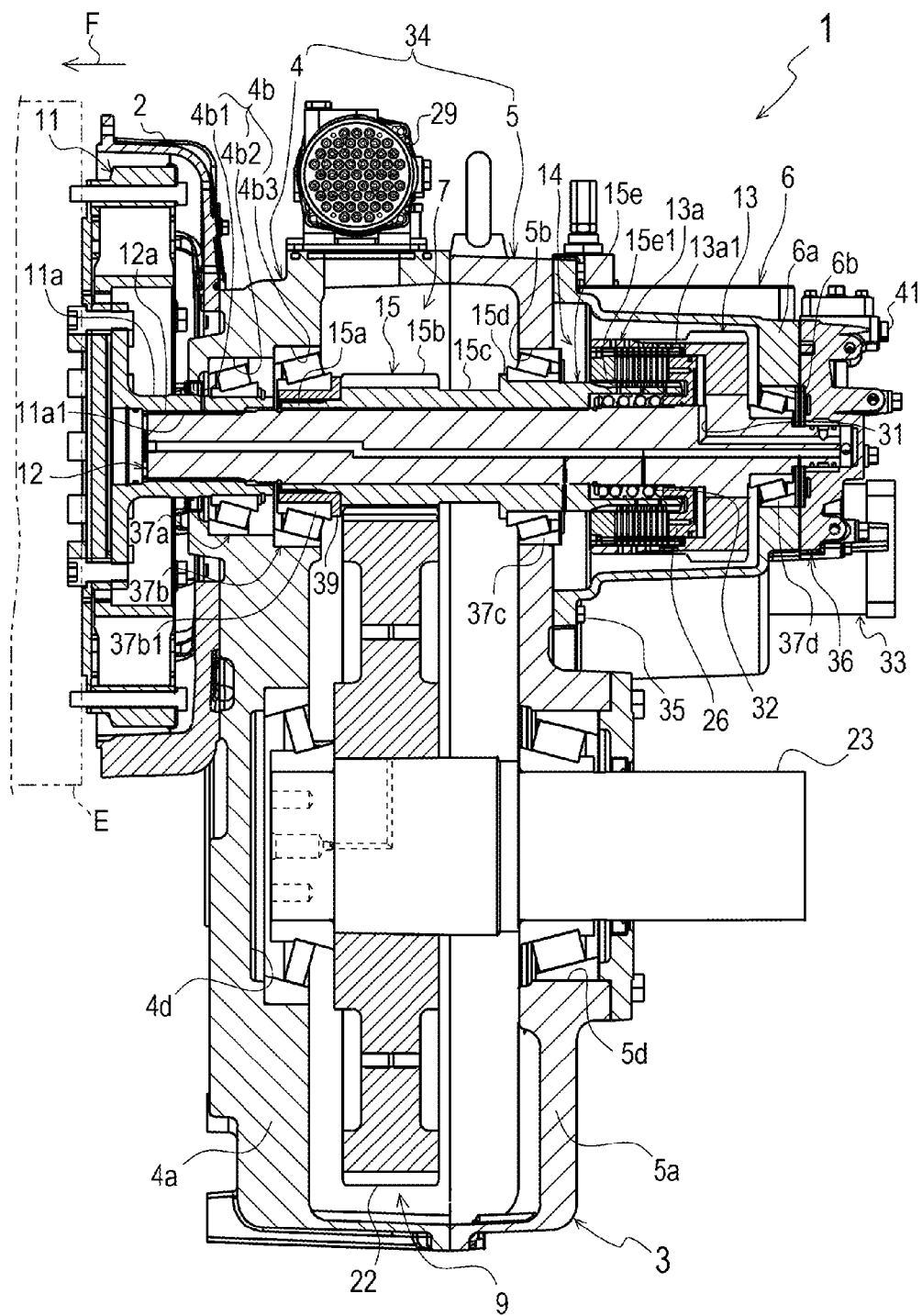
FIG. 3 is a cross-sectional view taken along the line A-A of FIG. 2.

Furthermore, as illustrated in FIG. 2, the backward transmission unit 8 is adjacently arranged obliquely downward to the left of the forward transmission unit 7, and the backward input gear 17 of the backward transmission unit 8 is always meshed with the forward input gear 13 of the forward transmission unit 7, and the backward input gear 17 is always driven by the motive power which is transmitted from the forward input shaft 12 to the forward input gear 13.

As illustrated in FIG. 3, the output transmission unit 9 is constituted by an output shaft 23 that is parallel to the forward input shaft 12 and connected to the propeller and an output gear 22 that is externally fitted and fixedly installed on the front portion of the output shaft 23. The output gear 22 is simultaneously meshed with the forward pinion 15 of the forward transmission unit 7 and the backward pinion 19 of the backward transmission unit 8.

In this case, the output gear 22 is larger in diameter than the pinions 15 and 19, so that forward decelerating gear trains 15 and 22 are formed between the forward transmission unit 7 and the output transmission unit 9, and backward decelerating gear trains 19 and 22 are formed between the backward transmission unit 8 and the output transmission unit 9.

The forward-backward switching procedure regarding the above-mentioned constitution of the motive power transmission will be described. When the forward-backward switching valve 28 is in a neutral position, the hydraulic oil is not supplied to any of the hydraulic piston 26 of the forward transmission unit 7 and the hydraulic piston 26A of the backward transmission unit 8, and both the forward clutch 14 and the backward clutch 18 are "disengaged".

In this case, the forward input shaft 12 and the forward input gear 13 are integrally rotated by the motive power of the engine E, and the backward input shaft 16 and the backward input gear 17 meshed with the forward input gear 13 are integrally rotated. However, any of the forward pinion 15 and the backward pinion 19 falls in a racing state with respect to the forward input shaft 12 and the backward input shaft 16, and the motive power is not transmitted to the output gear 22 with which the forward pinion 15 and the backward pinion 19 are simultaneously meshed.

Then, when the forward-backward switching valve 28 is switched to the forward position, the hydraulic oil pressure-transmitted through the hydraulic pump 27 is supplied to the hydraulic piston 26 of the forward transmission unit 7, whereas the hydraulic oil is not supplied to the hydraulic piston 26A of the backward transmission unit 8, and only the forward clutch 14 is "engaged".

In this case, the forward pinion 15 is coupled with the forward input shaft 12 via the forward clutch 14, and the motive power from the engine E is transmitted from the forward input shaft 12 to the output shaft 23 via the forward decelerating gear trains 15 and 22, and the propeller coupled with the output shaft 23 is driven by the forward power. In contrast, the backward pinion 19 is in a racing state with respect to the backward input shaft 16, and the motive power is not transmitted from the backward pinion 19 to the output shaft 23.

Alternatively, when the forward-backward switching valve 28 is switched to the backward position, the hydraulic oil is supplied to the hydraulic piston 26A of the backward transmission unit 8, whereas the hydraulic oil is not supplied to the hydraulic piston 26 of the forward transmission unit 7, and only the backward clutch 18 is "engaged".

In this case, the backward pinion 19 is coupled with the backward input gear 17 via the backward clutch 18, and the motive power from the engine E is transmitted from the forward input shaft 12, the forward input gear 13, the backward input gear 17, and the backward clutch 18 to the output shaft 23 via the backward decelerating gear trains 19 and 22, and the propeller coupled with the output shaft 23 is driven by the backward power. In the meantime, the forward pinion 15 is in a racing state with respect to the forward input shaft 12, and the motive power is not transmitted from the forward pinion 15 to the output shaft 23.

Figure 5:
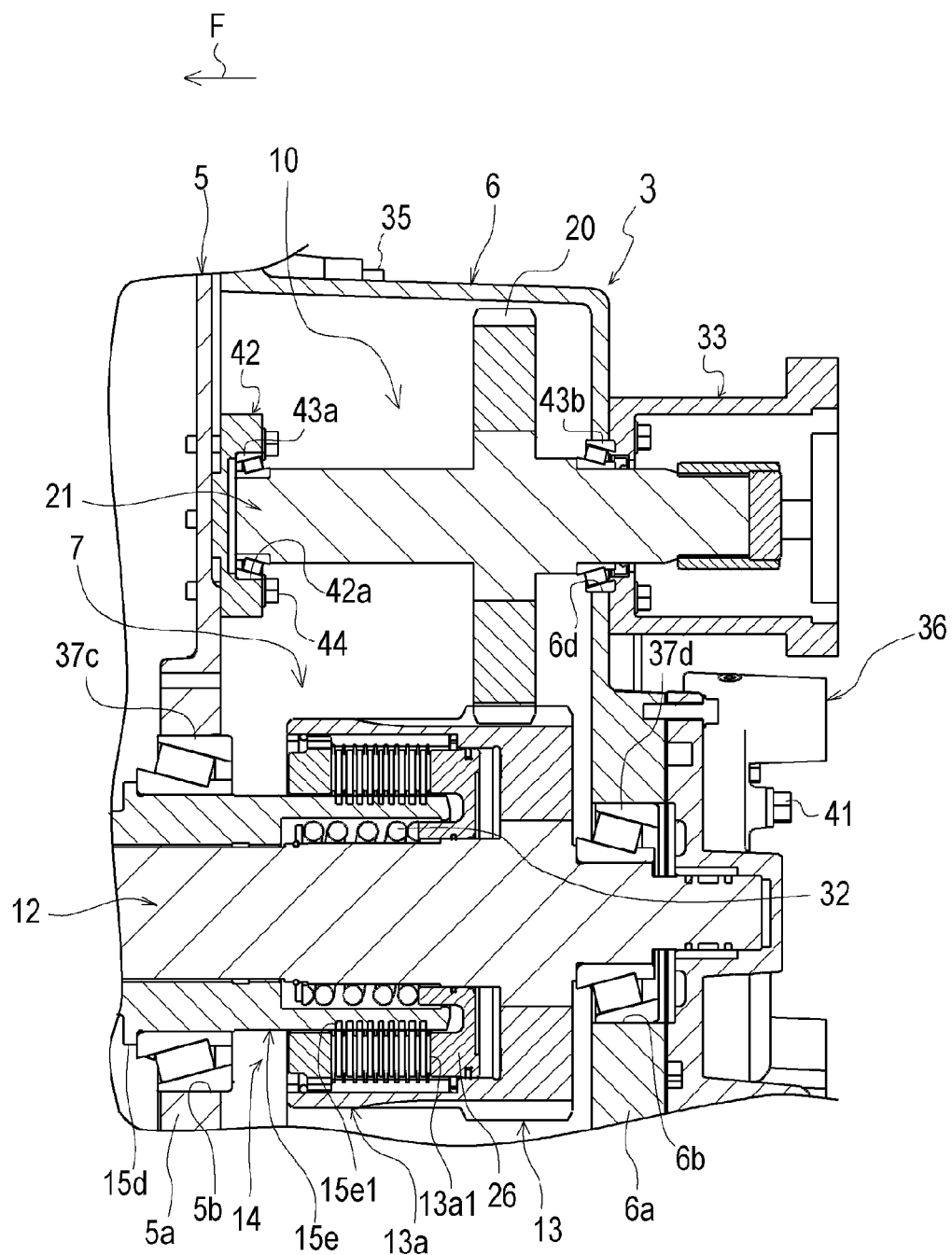
FIG. 5 is a cross-sectional view taken along the line C-C of FIG. 2.

Also, as illustrated in FIG. 5, the PTO transmission unit 10 is constituted by a PTO shaft 21 parallel to the forward input shaft 12 and a PTO gear 20 that is externally fitted and fixedly installed on the middle portion between the front and the back of the PTO shaft 21. The PTO gear 20 is meshed with the forward input gear 13 of the forward transmission unit 7, and the motive power from the engine is transmitted to the PTO shaft 21 via the forward input shaft 12, the forward input gear 13, and the PTO gear 20 at all times.

Then, the back end of the PTO shaft 21 is protruded backward from the housing 3 and coupled with the auxiliary instrument via a connecting structure 33, and the auxiliary instrument is driven by the motive power from the engine.

Next, the constitution of the housing 3 and the extraction constitution regarding the transmission units 7, 8, and 10 in the housing 3 will be described referring to FIGS. 2 to 6. The housing 3 is constituted by a case body 34 formed in a half-split shape halved back and front and made up of a first case 4 and a second case 5, and a case cover 6 that is detachably fastened and fixed by a plurality of bolts 35 on a back wall 5a of the second case 5.

Regarding the first case 4 out of these cases, a multistage first forward shaft hole 4b is bored in the back-and-forth direction on the upper portion of the front wall 4a that blocks the front surface thereof, and the first forward shaft hole 4b is constituted by a small diameter portion 4b1, a middle diameter portion 4b2, and a large diameter portion 4b3, each of which is formed in such a manner as to expand the diameter in order from the front on the same axis. Furthermore, a multistage first backward shaft concave portion 4c that is depressed forward is formed at a position obliquely downward to the left of the first forward shaft hole 4b in back view. The first backward shaft concave portion 4c is constituted by a small diameter portion 4c1, a middle diameter portion 4c2, and a large diameter portion 4c3, each of which is formed in such a manner as to expand the diameter in order from the front on the same axis. Additionally, a first output shaft concave portion 4d that is depressed forward is formed immediately below the first forward shaft hole 4b in back view.

Regarding the second case 5, on the back wall 5a that blocks the back surface thereof, a second forward shaft hole 5b, a second backward shaft hole 5c, and a second output shaft hole 5d are respectively bored at positions immediately behind the first forward shaft hole 4b, the first backward shaft concave portion 4c, and the first output shaft concave portion 4d.

Regarding the case cover 6, on a cover wall 6a that blocks the back surface thereof, a cover forward shaft hole 6b and a cover backward shaft hole 6c are respectively bored at positions immediately behind the second forward shaft hole 5b and the second backward shaft hole 5c, and a cover PTO shaft hole 6d is bored at a position obliquely downward to the right of the cover forward shaft hole 6b in back view.

Furthermore, on the cover wall 6a of the case cover 6, the cover plate 36 is detachably disposed in such a manner as to be covered, by means of a plurality of bolts 41, and a hydraulic circuit to supply/discharge the lubricating oil to/from the transmission units 7 to 10 or the hydraulic oil to/from the clutches 14 and 18 is formed in the interior of the cover plate 36 and formed of resin having translucency, through which the inside is visually recognized. Accordingly, the visualization of the hydraulic circuit can be achieved, and the maintainability is improved, and the weight reduction of the device and the reduction in costs can be achieved, compared with the case where the hydraulic circuit is made of metal.

Regarding the housing 3 having the above-mentioned constitution, a spline portion 12a is provided at the tip end of the forward input shaft 12 in the forward transmission unit 7, and the spline portion 12a is relatively unrotatably fitted and slidably inserted in the axial direction into the spline hole 11a1 of a connecting portion 11a provided in the damper 11. Furthermore, the connecting portion 11a is extended backward from the small diameter portion 4b1 to the middle diameter portion 4b2 in the first forward shaft hole 4b of the first case 4 and rotatably supported by the middle diameter portion 4b2 via a machine-body-side taper roller bearing 37a.

Herein, regarding the forward pinion 15 that is freely fitted into the forward input shaft 12, an insertion cylindrical portion 15a, whose diameter is smaller than that of a tooth portion 15b, and a shaft body 15c are formed, with the tooth portion 15b sandwiched back and forth, and the inner drum 15e is contiguously disposed at the back of the shaft body 15c.

The insertion cylindrical portion 15a is rotatably supported by the large diameter portion 4b3 of the first forward shaft hole 4b of the first case 4 via a first taper roller bearing 37b and a sleeve 39. The sleeve 39 is formed in a ring shape, and the outer circumferential surface of the sleeve 39 is adhered and fixed to the inner ring 37b1 of the first taper roller bearing 37b, whereas the insertion cylindrical portion 15a is relatively unrotatably fitted and slidably inserted in the axial direction into the inner circumferential surface of the sleeve 39. Then, in the present embodiment, a spline 15a1 is provided on the outer circumferential surface of the insertion cylindrical portion 15a, thereby reducing frictional resistance in the axial direction between the outer circumferential surface of the insertion cylindrical portion 15a and the inner circumferential surface of the sleeve 39.

Furthermore, the inner drum 15e is rotatably supported by the second forward shaft hole 5b of the second case 5 via a second taper roller bearing 37c. It is noted that a ring-shaped collar portion 15d that protrudes on the external side in the radial direction is provided between the shaft body 15c and the inner drum 15e, and the sliding of the second taper roller bearing 37c in the forward direction is regulated by the collar portion 15d.

The forward input shaft 12 is extended further backward with respect to the forward pinion 15, and the extended end of the forward input shaft 12 penetrates the case cover 6, and is rotatably supported by the cover forward shaft hole 6b of the case cover 6 via a third taper roller bearing 37d. Thus, the posterior portion of the forward transmission unit 7 with respect to the inner drum 15e, that is, the whole of the forward clutch 14 and the forward input gear 13 can be stored in the case cover 6.

Figure 6:
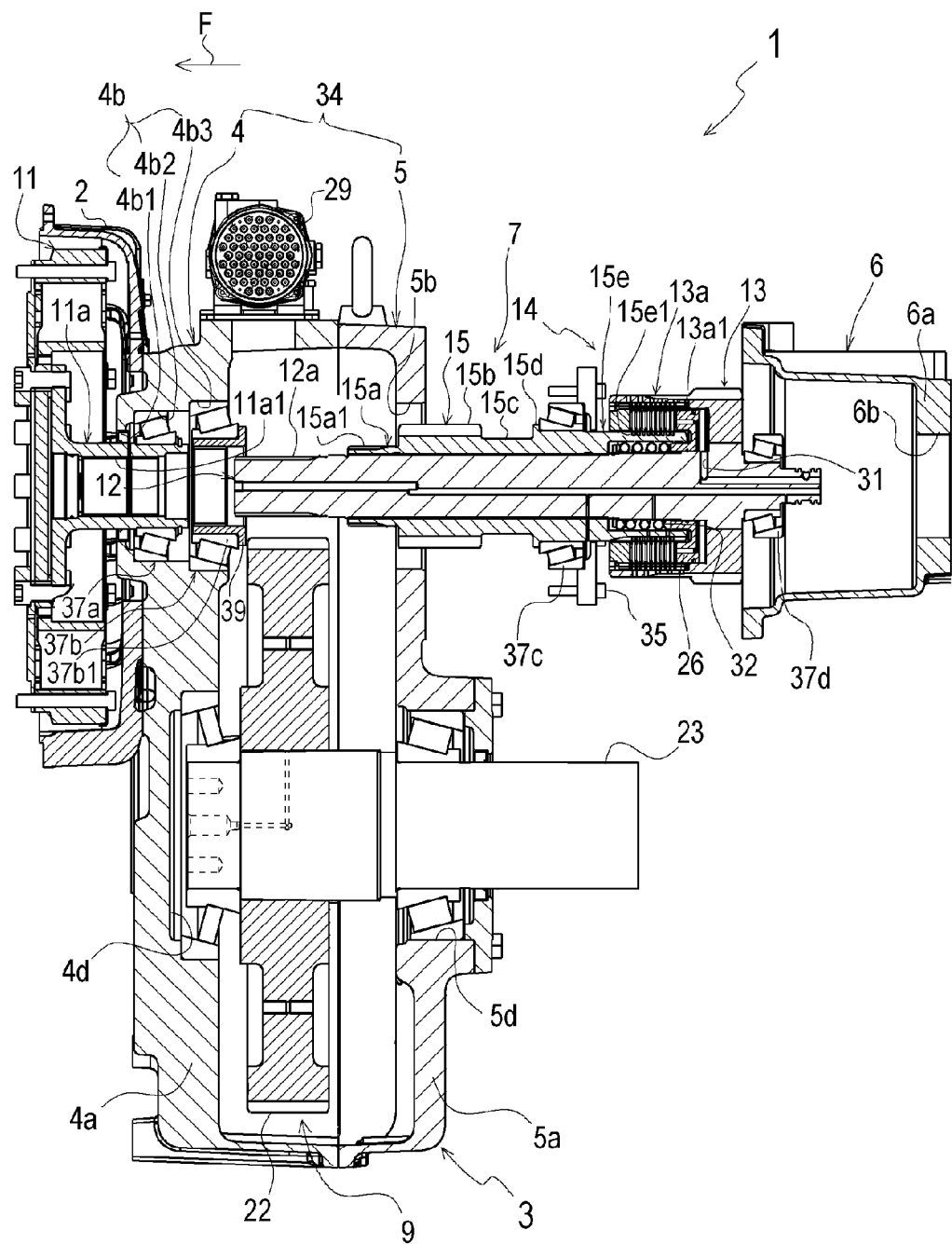
FIG. 6 is a partial cross-sectional view of the side surface of the device for decelerating and reversing ships when a forward transmission unit is taken out from a housing.

The procedure of taking the forward transmission unit 7, supported in the above-mentioned manner, out of the housing 3 will be described referring to FIGS. 3 and 6. First, the bolts 41 are pulled and removed, and the cover plate 36 to which the hydraulic pump 27 and the forward-backward switching valve 28 are attached is removed from the case cover 6, and subsequently the bolts 35 are pulled and removed, and while the third taper roller bearing 37d is left on the side of the forward input shaft 12, only the case cover 6 is detached from the second case 5.

Subsequently, the back portion of the forward input shaft 12 is held and pulled out backward. Then, as described above, the sliding of the second taper roller bearing 37c in the forward direction is regulated by the collar portion 15d, so that the second taper roller bearing 37c does not remain in the second forward shaft hole 5b of the second case 5 and is taken out together with the inner drum 15e in such a manner as to be pushed backward by the collar portion 15d.

Furthermore, as described above, whereas the sleeve 39 is adhered and fixed in the first taper roller bearing 37b, the sleeve 39 and the insertion cylindrical portion 15a are constituted in such a manner as to be slidable with each other in the axial direction, so that when the back portion of the forward input shaft 12 is held and pulled out backward, the first taper roller bearing 37b remains together with the sleeve 39 in the large diameter portion 4b3 of the first forward shaft hole 4b of the first case 4, and only the insertion cylindrical portion 15a is taken out. In particular, as the present embodiment, when the spline 15a1 is formed on the outer circumferential surface of the insertion cylindrical portion 15a, frictional resistance is reduced, and the forward pinion 15 can be inserted and extracted with a small force into/from the sleeve 39.

In this case, as described above, the spline portion 12a disposed at the tip end of the forward input shaft 12 is slidably fitted and inserted in the axial direction into the spline hole 11a1 of the connecting portion 11a, so that when the back portion of the forward input shaft 12 is held and pulled out backward, only the tip end of the forward input shaft 12 is taken out from the connecting portion 11a.

Also, regarding the backward transmission unit 8, in substantially in the same way, the tip end portion of the backward input shaft 16 is relatively unrotatably fitted and slidably inserted in the axial direction into a machine-body-side taper roller bearing 38a that is disposed and fitted to the first backward shaft concave portion 4c of the first case 4.

Herein, regarding the backward pinion 19 that is freely fitted into the backward input shaft 16, an insertion cylindrical portion 19a, whose diameter is smaller than that of a tooth portion 19b, and a shaft body 19c are formed, with the tooth portion 19b sandwiched back and forth, and the inner drum 19e is contiguously disposed at the back of the shaft body 19c.

The insertion cylindrical portion 19a is rotatably supported by the large diameter portion 4c3 of the first backward shaft concave portion 4c of the first case 4 via a first taper roller bearing 38b and a sleeve 40. The sleeve 40 is also formed in a ring shape, and the outer circumferential surface of the sleeve 40 is adhered and fixed to the inner ring 38b1 of the first taper roller bearing 38b, whereas the insertion cylindrical portion 19a is relatively unrotatably fitted and slidably inserted in the axial direction into the inner circumferential surface of the sleeve 40. Then, a spline 19a1 is also provided on the outer circumferential surface of the insertion cylindrical portion 19a, thereby reducing frictional resistance in the axial direction between the outer circumferential surface of the insertion cylindrical portion 19a and the inner circumferential surface of the sleeve 40.

Furthermore, the inner drum 19e is rotatably supported by the second backward shaft hole 5c of the second case 5 via a second taper roller bearing 38c. It is noted that a collar portion 19d is provided between the shaft body 19c and the inner drum 19e.

The extended end of the backward input shaft 16 is also rotatably supported by the cover backward shaft hole 6c of the case cover 6 via a third taper roller bearing 38d. Thus, the posterior portion of the backward transmission unit 8 with respect to the inner drum 19e, that is, the whole of the backward clutch 18 and the backward input gear 17 can be stored in the case cover 6.

When the backward transmission unit 8 supported in the above-mentioned manner is taken out of the housing 3, as is the same case with the forward transmission unit 7, first, the bolts 41 are pulled and removed, and the cover plate 36 is removed from the case cover 6, and subsequently the bolts 35 are pulled and removed, and while the third taper roller bearing 38d is left on the side of the backward input shaft 16, only the case cover 6 is detached from the second case 5. Subsequently, when the back portion of the backward input shaft 16 is held and pulled out backward, the second taper roller bearing 38c does not remain in the second backward shaft hole 5c of the second case 5 and is taken out together with the inner drum 19e in such a manner as to be pushed backward by the collar portion 19d.

Furthermore, the first taper roller bearing 38b remains together with the sleeve 40 in the large diameter portion 4c3 of the first backward shaft concave portion 4c of the first case 4, and only the insertion cylindrical portion 19a is taken out.

That is, the housing 3 is formed in such a manner that the first case 4, the second case 5, and the case cover 6 which is detachable with the second case 5 are aligned in order from the front side, which is one side of the device 1 for decelerating and reversing ships as a device, to the back side, which is the other side of the decelerating and reversing device 1. The forward transmission unit 7 and the backward transmission unit 8, which are forward and backward propulsion transmission units, are stored in the housing 3, regarding any of the forward transmission unit 7 and the backward transmission unit 8, with respect to the device 1 for decelerating and reversing ships, which is constituted of the forward pinion 15 and the backward pinion 19 that are pinions meshed with the output gear 22 coupled with the propeller, the forward input shaft 12 and the backward input shaft 16 that are input shafts through which the forward pinion 15 and the backward pinion 19 are freely fitted in the middle of each input shaft, the forward input gear 13 and the backward input gear 17 that are input gears fixedly disposed on the back side of the forward input shaft 12 and the backward input shaft 16, and the forward clutch 14 and the backward clutch 18 that are clutches interposed in such a manner as to connect and disconnect motive power between the forward input gear 13 and the forward pinion 15 and between the backward input gear 17 and the backward pinion 19, and the front sides of the forward pinion 15 and the backward pinion 19 are rotatably supported by the first case 4 via the first taper roller bearings 37b and 38b which are first rolling bearings, and the back sides of the forward pinion 15 and the backward pinion 19 are rotatably supported by the second case 5 via the second taper roller bearings 37c and 38c which are second rolling bearings, and the back sides of the forward input shaft 12 and the backward input shaft 16 are rotatably supported by the case cover 6 via the third taper roller bearings 37d and 38d which are third rolling bearings, and the forward clutch 14, the backward clutch 18, the forward input gear 13, and the backward input gear 17 are stored in the case cover 6, and it is configured that the sleeves 39 and 40 are interposed between the first taper roller bearings 37b and 38b and the front sides of the forward pinion 15 and the backward pinion 19, and the forward pinion 15 and the backward pinion 19 can be inserted and extracted into/from the sleeves 39 and 40, so that the second taper roller bearings 37c and 38c and the third taper roller bearings 37d and 38d can be taken out from the housing 3 together with the forward transmission unit 7 and the backward transmission unit 8 only by pulling out the forward input shaft 12 and the backward input shaft 16 after the detachment of the case cover 6, and it is not necessary to disassemble the entire housing 3 for maintenance of the first taper roller bearings 37b and 38b, the second taper roller bearings 37c and 38c, and the third taper roller bearings 37d and 38d, which improves maintainability. Furthermore, only the detachment of the case cover 6 allows the forward clutch 14, the backward clutch 18, the forward input gear 13, the backward input gear 17, and the third taper roller bearings 37d and 38d to be exposed to the outside, so that maintenance can be more easily performed for the forward clutch 14, the backward clutch 18, the forward input gear 13, the backward input gear 17, and the third taper roller bearings 37d and 38d, which are components of these. Additionally, load acted on the first taper roller bearings 37b and 38b, the second taper roller bearings 37c and 38c, and the third taper roller bearings 37d and 38d can be decentralized into a plurality of members made up of the first case 4, the second case 5, and the case cover 6. The first taper roller bearings 37b and 38b, the second taper roller bearings 37c and 38c, and the third taper roller bearings 37d and 38d are firmly supported, and the deviation of the rotational shaft center during rotation is reduced, so that noise and damage on the first taper roller bearings 37b and 38b, the second taper roller bearings 37c and 38c, and the third taper roller bearings 37d and 38d can be substantially restrained.

Furthermore, the splines 15a1 and 19a1 are provided on the front side, which is one side of the forward pinion 15 and the backward pinion 19 as the pinions, and the insertion cylindrical portions 15a and 19a, where the splines 15a1 and 19a1 are formed as the spline portions, are fitted and inserted into the sleeves 39 and 40, so that frictional resistance can be reduced in a case where the insertion cylindrical portions 15a and 19a are slid on the inner circumferential surfaces of the sleeves 39 and 40 in the axial direction, and a force required for inserting and extracting the forward pinion 15 and the backward pinion 19 into/from the sleeves 39 and 40 can be reduced, and work load for maintenance can be alleviated.

Also, regarding the PTO transmission unit 10, in the second case 5 positioned obliquely downward to the right of the second forward shaft hole 5b in back view, a boss member 42 is fastened and fixed by a plurality of bolts 44, and a PTO shaft concave portion 42a that is depressed forward is formed in the boss member 42, and the front end of the PTO shaft 21 is rotatably supported by the PTO shaft concave portion 42a via a front taper roller bearing 43a. On the other hand, the middle portion of the posterior portion of the PTO shaft 21 with respect to the PTO gear 20 is rotatably supported by the cover PTO shaft hole 6d of the case cover 6 via a back taper roller bearing 43b.

When the PTO transmission unit 10 supported in the above-mentioned manner is taken out of the housing 3, first, the bolts 35 are pulled and removed, and while the back taper roller bearing 43b is left on the side of the PTO shaft 21, only the case cover 6 is detached from the second case 5. Subsequently, when the back portion of the PTO shaft 21 is held and pulled out backward, the front taper roller bearing 43a remains in the PTO shaft concave portion 42a of the boss member 42, and the back taper roller bearing 43b is taken out together with the PTO shaft 21. Accordingly, it is not necessary to disassemble the entire housing 3 for the purpose of maintenance of the front taper roller bearing 43a and the back taper roller bearing 43b, which improves maintainability.

INDUSTRIAL APPLICABILITY

The present invention can be applied to all the devices for decelerating and reversing ships, wherein a first case, a second case, and a case cover detachable with the second case are aligned in order from one side to the other side of the device in such a manner as to form a housing, and forward and backward propulsion transmission units are stored in the housing, and any of the propulsion transmission units comprises a pinion configured to mesh with an output gear coupled with a propeller, an input shaft configured to be freely fitted with the pinion in a middle thereof, an input gear configured to be fixedly disposed on the other side of the input shaft, and a clutch configured to be interposed between the input gear and the pinion in such a manner as to connect and disconnect motive power.

The invention claimed is:

1. A speed-reducing and reversing device for a vessel, comprising:
a housing comprising a case body and a case cover, the case body comprising a first end portion being disposed adjacent to an engine of the vessel and a second end portion disposed opposite the engine, an outer end surface of the second end portion of the case body defining a joint plane, and the case cover being disposed opposite the engine with respect to the case body and comprising a first end portion detachably attached to the second end portion of the case body at the joint plane and a second end portion opposite the case body, wherein the housing comprises a first chamber in the case body between the first and second end portions of the base body, and a second chamber in the case cover between the joint plane and the second end portion of the case cover;
a forward propulsion unit and a backward propulsion unit stored in the housing;
a pair of first bearings and a pair of second bearings disposed in the first end portion of the case body;
a pair of third bearings disposed in the second end portion of the case body;
a pair of fourth bearings disposed in the second end portion of the case cover;
a coupling sleeve fitted to an inner circumferential surface of one of the first bearings, the coupling sleeve being connected to the engine; and
a pair of sleeves each of which is fitted to an inner circumferential surface of an inner raceway of a corresponding one of the pair of second bearings;
wherein the forward and backward propulsion transmission units comprise:
a pair of cylindrical hollow pinions, each of which includes first and second end portion and a toothed intermediate portion between the first and second end portions thereof, the toothed intermediate portion of the pinion being disposed in the first chamber in the case body to mesh with an output gear coupled with a propeller,
wherein each of the pinions is fitted at the first end portion thereof to the inner circumferential surface of the inner raceway of a corresponding one of the pair of second bearings via a corresponding one of the pair of sleeves, and is fitted at the second end portion thereof to an inner circumferential surface of a corresponding one of the pair of third bearings;
a pair of input shafts each of which is extended through a corresponding one of the pair of pinions, each of the pair of input shafts including first and second end portions having the corresponding pinion therebetween, wherein each of the pair of input shafts is fitted at the first end portion thereof to an inner circumferential surface of a corresponding one of the pair of first bearings, one of the pair of input shafts being fitted to the first bearing via the coupling sleeve, and is fitted at the second end portion thereof to an inner circumferential surface of a corresponding one of the pair of fourth bearings;
a pair of input gears disposed in the second chamber in the case cover, each of the pair of input gears being fixed on a corresponding one of the pair of input shafts, and
a pair of clutches disposed in the second chamber in the case cover, each of the clutches comprising an input clutch element and an output clutch element,
wherein the input clutch element of each of the pair of clutches is directly fitted to the corresponding one of the pair of input gears unrotatably relative to a corresponding one of the pair of input gears, and
wherein the second end portions of the pair of pinions are extended into the second chamber in the case cover through the joint plane, and the output clutch elements of each of the pair of clutches is directly fitted to the extended second end portion of a corresponding one of the pair of pinions unrotatably relative to the corresponding one of the pair of pinions.

2. The speed-reducing and reversing device for a vessel according to claim 1,
wherein an outer circumferential surface of the first end portion of each of the pair of pinions and an inner circumferential surface of the corresponding sleeve are spline-fitted to each other.

3. The speed-reducing and reversing device for a vessel according to claim 1, wherein an inner circumferential surface of the coupling sleeve and an outer circumferential surface of the first end portion of the input shaft fitted in the coupling sleeve are spline-fitted to each other.

4. The speed-reducing and reversing device for a vessel according to claim 1, wherein the device is configured such that, in a state in which the case cover is detached from the case body, the one of the pair of input shafts can be pulled to extract the first end portion thereof from the coupling sleeve, and each of the pair of input shafts can be pulled to extract the first end portion of the corresponding one of the pair of pinions from the respective sleeves, whereby the entire forward and backward propulsion units, which the input shafts have the input gears, the clutches, and the pinions fitted thereon, can be moved together with the third bearings on the pinions and the fourth bearings on the input shafts, following the detached case cover, so as to be withdrawn from the case body.

\* \* \* \* \*